United States Patent [19]

Garczynski et al.

[11] 4,065,662
[45] Dec. 27, 1977

[54] CARD READER SYSTEM WITH IMPROVED INTERFACE

[75] Inventors: John S. Garczynski, Norristown; Charles C. Jablanofsky, Feasterville; Joseph P. Murray, Schwenksville, all of Pa.

[73] Assignee: Peripheral Dynamics, Inc., Norristown, Pa.

[21] Appl. No.: 690,261

[22] Filed: May 26, 1976

[51] Int. Cl.² .............. G06K 17/00; G06K 7/00; G06F 3/04
[52] U.S. Cl. .................... 235/419; 235/435; 364/900
[58] Field of Search ............ 235/61.6 R, 61.11 R; 340/172.5

[56] References Cited

U.S. PATENT DOCUMENTS

| | | |
|---|---|---|
| 3,124,674 | 3/1964 | Edwards et al. .......... 235/61.6 R |
| 3,771,135 | 11/1973 | Huettner et al. ......... 340/172.5 |
| 3,805,245 | 4/1974 | Brooks et al. .......... 235/61.6 R |
| 4,012,720 | 3/1977 | Call et al. ............. 235/61.11 A |

Primary Examiner—Daryl W. Cook
Attorney, Agent, or Firm—Woodcock, Washburn, Kurtz & Mackiewicz

[57] ABSTRACT

A card reader system providing for a plurality of card reader units to be interfaced commonly to a single central processing unit, each card reader unit having an interface assembly wholly contained within the card reader electronics package and providing for Hollerith to ASCII conversion, retransmission of card data as often as requested, and suppression of trailing zeros in the transmitted card data. Each interface assembly provides for the generation and transmission of status signals upon the occurrence of predetermined card reader conditions. Means are provided in each card reader for receiving address characters from the CPU whereby each respective card reader is selectively enabled or disenabled from communicating with the CPU depending upon whether or not it has been properly addressed.

25 Claims, 5 Drawing Figures

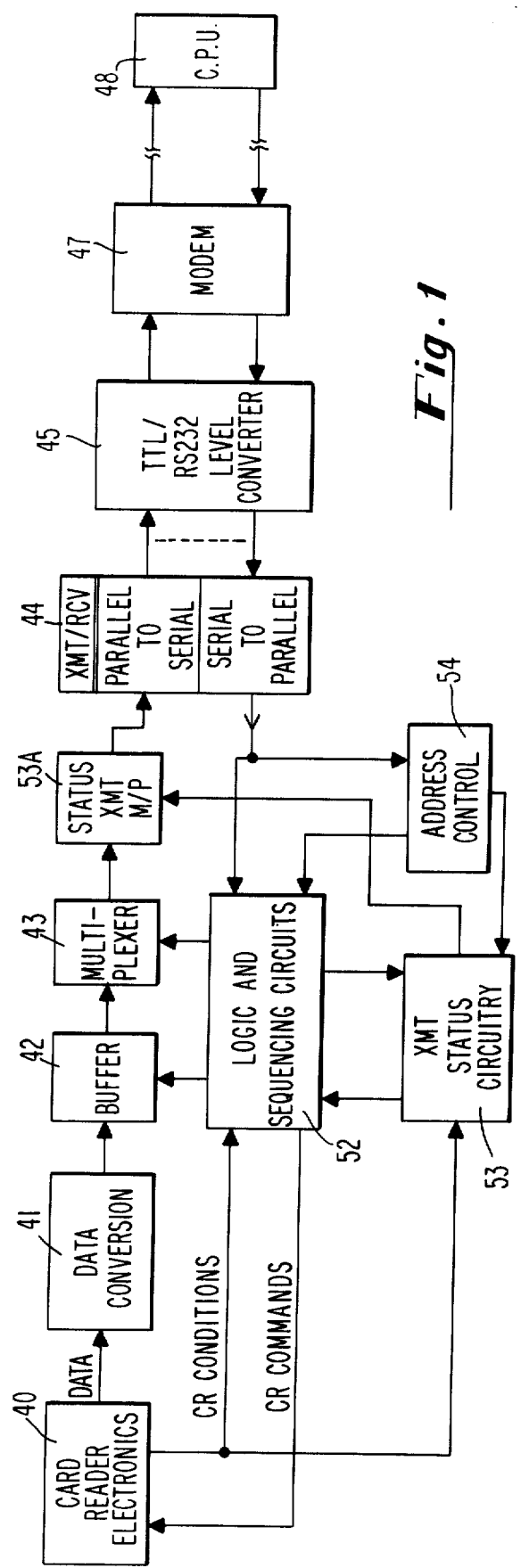
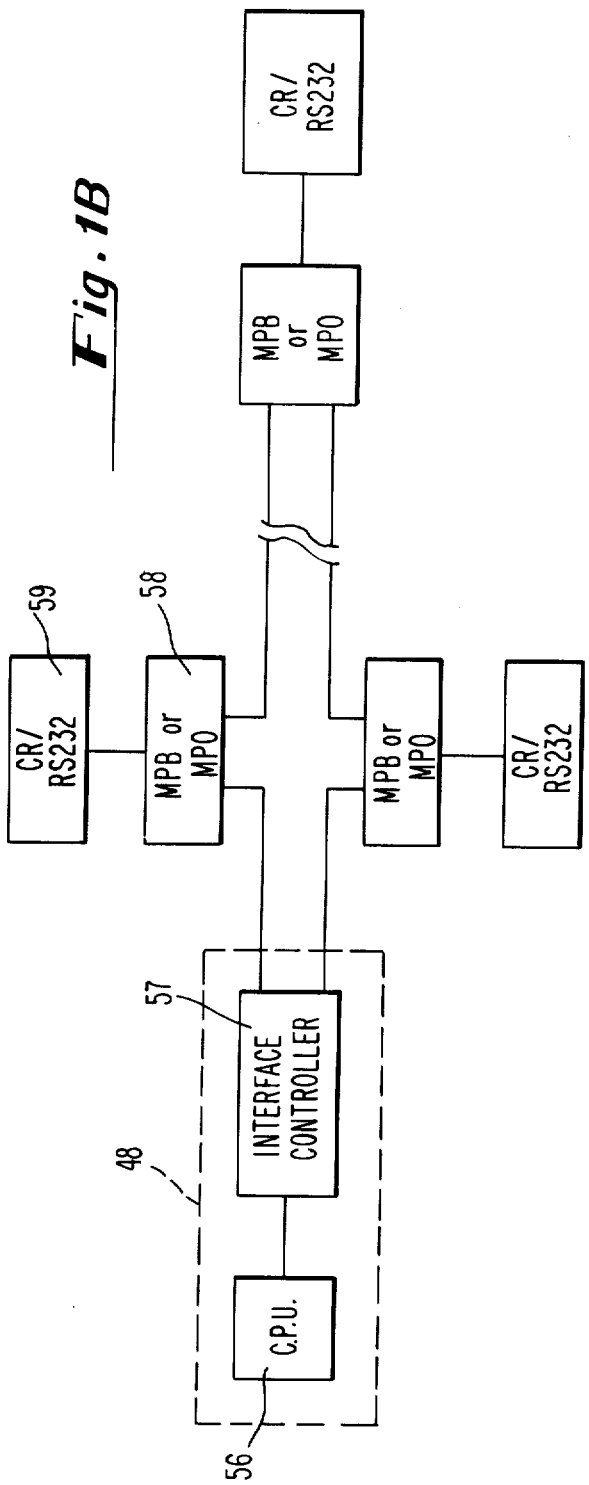
Fig. 1
Fig. 1B

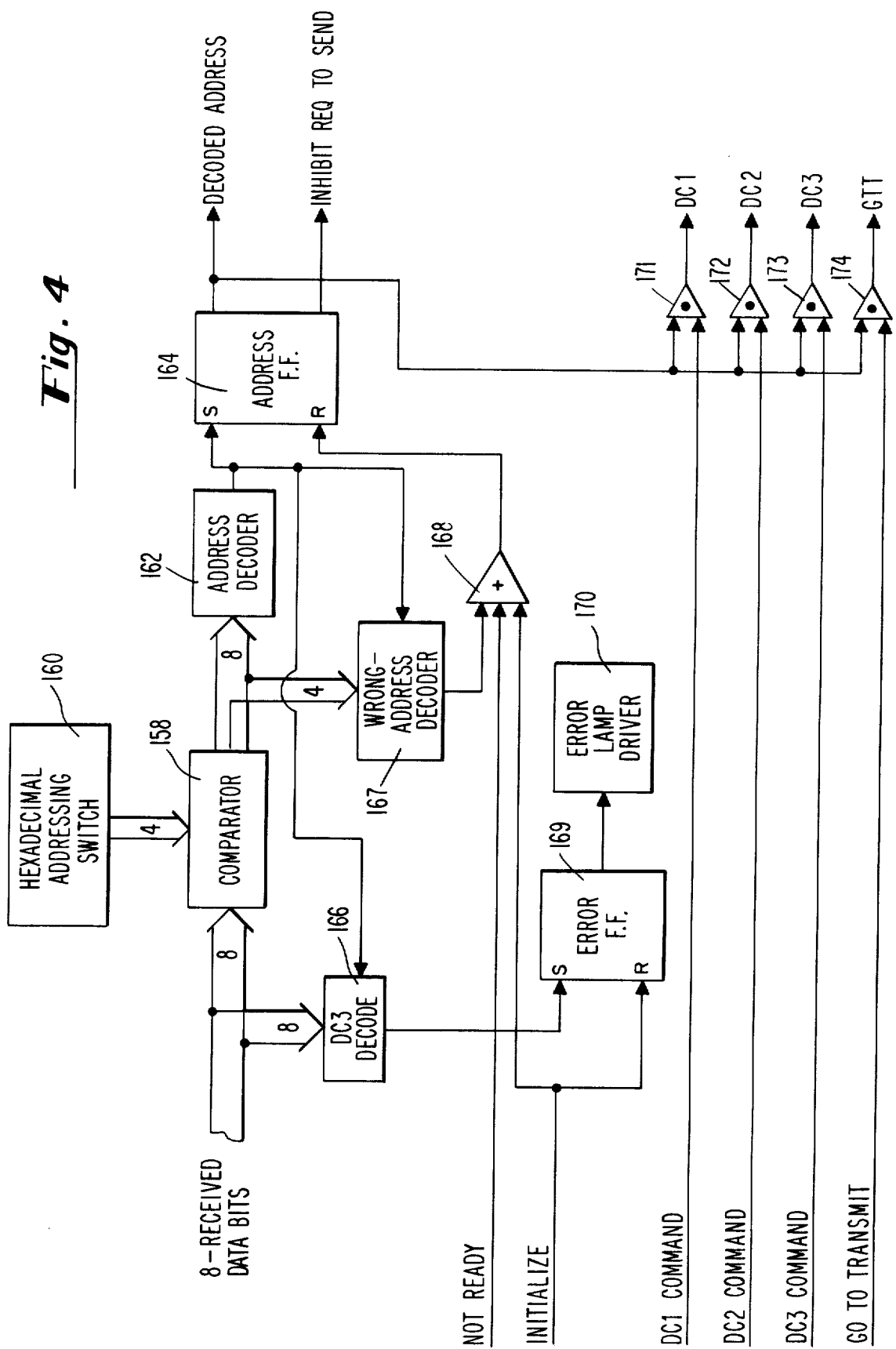

CARD READER SYSTEM WITH IMPROVED INTERFACE

BACKGROUND OF THE INVENTION

1. Field of the Invention

This invention relates to interface electronics incorporated into card readers, and in particular interface assemblies enabling communication between a plurality of respective card readers and a central processing unit.

2. Description of the Prior Art

Card reader units for reading paper cards containing punched or marked information have been in widespread use in the electronic data processing area for some years. The versatility of card readers as input elements in larger information processing systems is greatly enhanced by the ability of interfacing the reader directly with a central processing unit (CPU). Such interfacing requires interface electronic circuitry for generating and transmitting commands from the card reader to the CPU, as well as for receiving and coding commands coming from the CPU to the card reader. Additionally, and perhaps most fundamentally, an interface is required to convert the normal card reader TTL level parallel output lines to an RS232 level serial bit stream suitable for use with a CPU or other data communications equipment. It is desirable that the interface package be wholly contained within the card reader electronics. It is further required of the interface that it convert card reader information from Hollerith to ASCII, provide for retransmission of a previous card's data as often as requested, and be compatible with punch card readers as well as optical mark sense card readers, in both the 40 column and 80 column mode.

In addition to the above, there is a great need for a card reader interface assembly which provides for a flexible easily incorporated means for generating and transmitting status characters from the card reader to the central processing unit, so that the card reader may communicate quickly and efficiently with the CPU. Likewise, there is a great need in the industry for card reader interface electronics which cooperates with the CPU so that a plurality of card reader units may be programmably interfaced with the CPU, either singly or in combination.

SUMMARY OF THE INVENTION

It is a primary object of this invention to provide an asynchronous serial interface converter unit for incorporation into a card reader which integrally incorporates means for carrying out the conventionally required interface functions in an efficient and inexpensive manner, and also provides flexible means for generating and transmitting status signals from the card reader to the CPU with which it communicates.

It is a further object of this invention to provide a system of card readers addressably connected to a common CPU, whereby the operations carried out by respective card readers may be addressably controlled by the CPU.

It is a further object of this invention to provide a card reader interface assembly having status transmission circuitry which is controlled on the basis of address commands from the CPU with which it communicates.

In accordance with the above objectives, there is provided a card reader interface assembly, adapted for use in combination with a plurality of similar assemblies, each of which is in communication with a given central processing unit, each such assembly providing means for performing the functions of data conversion so that parallel data from the card reader can be transmitted in serial form to the CPU and so that serially transmitted command characters are made available in parallel form for use by the card reader. Each interface assembly comprises means for generating status characters and transmitting such status characters in accordance with a predetermined program, and address means for accepting and analyzing address characters from a central CPU, whereby the card reader follows commands from the CPU depending upon whether or not it has been properly addressed.

BRIEF DESCRIPTION OF THE DRAWINGS

FIG. 1 is a block diagram illustrating the primary components of the card reader of this invention in combination with a central processing unit.

FIG. 1B is a block diagram illustrating a system with addressable card reader units.

FIG. 4 is a block diagram of the address/error control circuitry for the addressable reader system of this invention.

DESCRIPTION OF THE PREFERRED EMBODIMENTS

Figure 2:
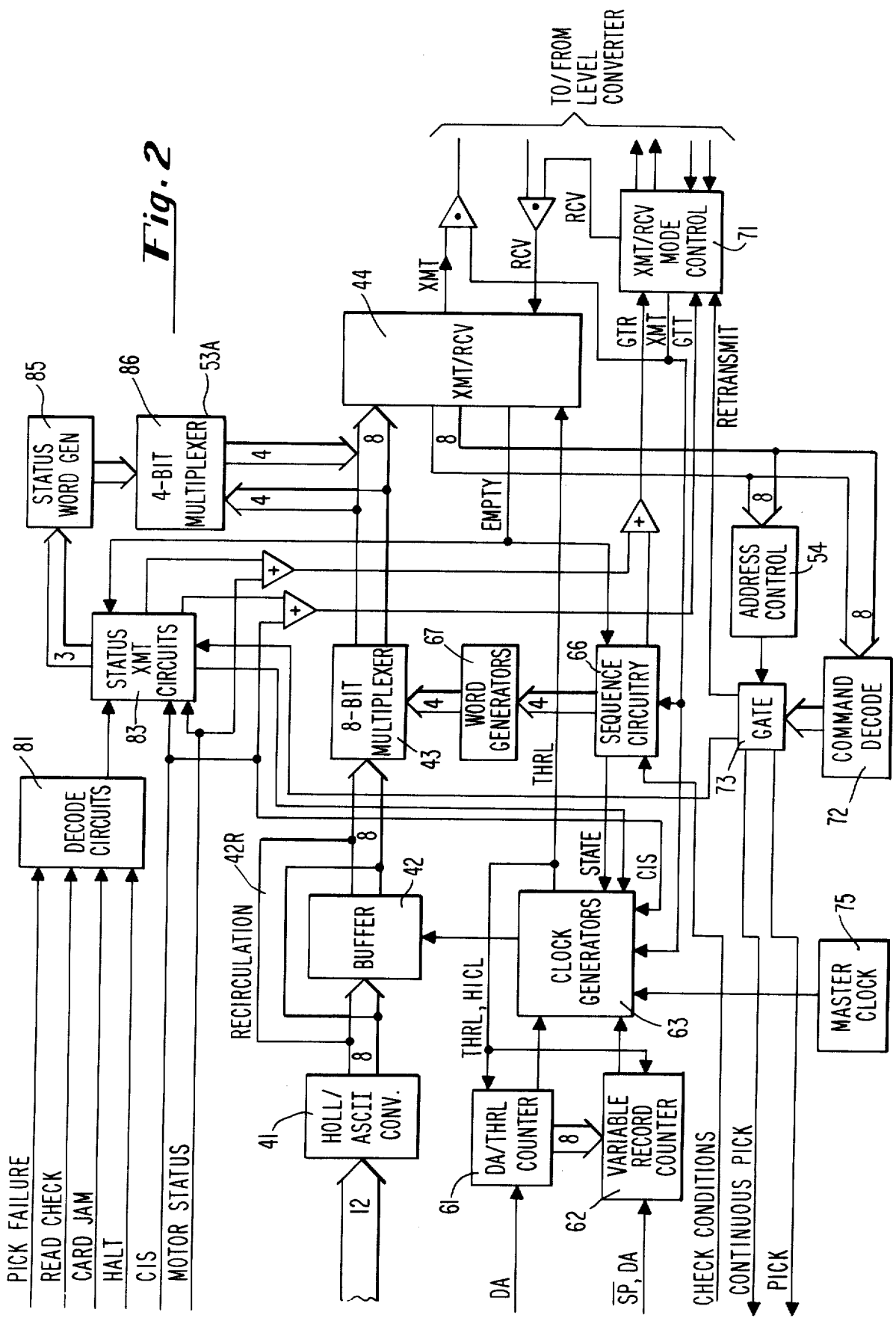
FIG. 2 is a detailed block diagram of the main portions of the interface assembly of this invention.

FIG. 1 illustrates the main features of the subject apparatus of this invention, in block diagram form. Block 40 is designated Card Reader Electronics, and represents the electronics portion of the card reader which generates data which has been read from cards passed through the reader, as well as reader status signals, and which receives card reader commands, i.e., pick, continuous pick, etc. The data, as indicated in FIG. 2, is produced by the card reader on 12 parallel data lines, representing the 12 rows of a paper card. The data is transmitted to Hollerith/ASCII converter circuitry, indicated by block 41, which performs the function of compressing the data from 12 lines to eight lines while altering the encoding format from a Hollerith to an ASCII code. In applicant's system, this converter suitably includes an IC type MM 5230B0-1. The eight data output lines from data conversion block 41 are connected to the input of buffer 42, which is suitably an 8 × 80 MOS buffer, type 3347, having the capacity for storing 80 eight-bit data characters. The eight-bit data characters from the converter are sequenced into the buffer by buffer clock signals from the logic and sequencing circuits indicated in block 52. Block 52 includes the clock shown in FIG. 2 at block 75. The output of buffer 42, also eight data lines, is inputted into multiplexer 43, which has the capacity for passing through the data characters or other characters generated by the logic and sequencing circuits, when it receives the proper sequence signals from block 52. The output from multiplexer 43 is inputted into status transmit multiplexer 53A, which provides additional capacity for transmitting status words. When no status word is being transmitted, and data is being read out of buffer 42 for transmission, the status transmit multiplexer simply provides a through path from the multiplexer through to the transmit/receive assembly 44. Assembly 44 suitably comprises a commercially available chip, type TR 1402A, referred to hereinafter as the TR chip. The TR chip carries out the function of transforming inputted parallel data into serial data, for subsequent transmission to the communications equipment, and converting inputted serial data which has come from the communications equipment to parallel data carrying command information, which parallel data is passed through to the logic and sequencing circuits 52 and to the card reader. The serial output from assembly 44 is connected to the TTL/RS232 level converter 45, the output of which is passed through modem 47 to the communications equipment 48, which is the ultimate target of the data from the card reader. Commands coming from equipment 48 are transmitted to and through modem 47, to and through level converter 45 and to the TR chip of assembly 44.

Still referring to FIG. 1, there is shown a block titled XMT Status Circuitry, designated 53. This circuitry, which interacts with the logic and sequencing circuits, carries out the function of generating signals representative of the status of the card reader. These signals are connected through status transmit multiplexer 53A to generate appropriate status words for transmission through to the communications equipment. The signals from circuitry 53 also are utilized to affect the sequencing of the overall apparatus through logic and sequencing circuitry 52, as a function of the sensed card reader status.

As shown at block 54, the apparatus of this invention also comprises address control circuitry, whereby the interface assembly has means enabling each reader to respond to a unique serial address as communicated from the communications equipment. With this feature, by way of example, the interface unit provides a capacity whereby up to 16 addressable readers may each be tied or attached to a common communication line emanating from the communication equipment. The address control means suitably includes a binary coded decimal (BCD) rotary switch whereby the address of each reader can be varied to any number 0 through 15. The overall system has the capability whereby the CPU through the communications equipment can address any one of the 16 units tied to its output lines, whereafter only that unit which is addressed will respond in the manner as requested.

As illustrated in FIG. 1B, the communications equipment typically comprises a central processing unit (CPU) 56 connected with an interface controller 57. The lines from the interface controller, in the embodiment illustrated, are connected to up to 16 card readers, each connection to a card reader with RS232 interface (designated 59) being made through a modem bypass or multi port option unit 58. As is discussed in more detail below, it is important to note that more than 16 readers may be addressably connected to a single CPU within the scope of this invention. This specification discloses a preferred and illustrative embodiment wherein the circuitry is worked out for up to 16 card reader units.

Referring now to FIG. 2, there is shown an expanded and more detailed block diagram of the main portions of the interface assembly of this invention. Reference is made to Table A, which contains a listing of symbols used in FIGS. 2, 3 and 4.

TABLE A

| SYMBOL | DESCRIPTION |
|---|---|
| ACK | Acknowledge (Status Word) |
| BA | Transmit Data; Signal from interface to CPU. |
| BB | Receive Data; signal to interface from CPU. |
| BEL | Trouble (Status Word) |
| CA | Request to Send; signal from interface to CPU. |
| CB | Clear To Send; signal from CPU to interface. |
| CD | Data Ready; signal from interface to CPU |
| CF | Carrier present; signal from CPU to interface. |
| CIS | Card In Station |
| CIS SS | Card In Station Single Shot; negative pulse generated at the trailing edge of a card being read, which causes initiation of XMT sequence. |
| CR | Carriage Return |
| DA | Data Available; Signal corresponding to each column of card data being read. |
| DA/THRL | Counts when inputted with DA or THRL pulses. |
| DC1 | Pick Command |
| DC2 | Retransmit Command |
| DC3 | Error/Continuous Pick Command |
| DR | Data Received - Indicates data received at TR chip from CPU. |
| DRR | Data Received Reset - Negative pulse which resets DR line. |
| ENQ | Card Reader Ready For Use (Status Word) |
| EOT | End of Transmission |
| GTR | Go To Receive |
| GTT | Go To Transmit |
| Ip | Initialize Pulse - negative pulse from card reader generated whenever power turned on, or front panel reset button pushed. |
| LF | Line Feed |
| MBP | Modem Bypass Option |
| MPO | Multi Port Option |
| NAK | Negative Acknowledge (Status Word) |
| RCV | Receive |
| RRC | Receiver Register Clock |
| SP | Not space; a logic "one" when other than all zero characters read from card. |
| STATE 0 | Card Read State |
| STATE 1 | Line Feed Character Transmission |
| STATE 2 | Data Transmission |
| STATE 3 | Carriage Return Character Transmission |
| STATE 4 | Interrogate "check conditions" Line; transmit EOT character if last card has been read. |
| STATE 5 | Return to RCV mode; if no "retransmit" command, turn off CD line and READY lamp. |
| THRE | Transmit Hold Register Empty |
| THRL | Transmit Holding Register Load |
| TRC | Transmitter Register Clock |
| TRE | Transmit Register Empty |
| TRO | Transmitter Register Output |
| VCR | Variable Record Counter Records complement of last non-zero count in DA/THRL |
| XMT | Transmit |

As indicated at the left of the diagram, the 12 data lines are inputted to the HOLL/ASCII converter 41. In applicant's assembly, this converter contains conventional logic which compresses the signals in a chosen manner from 12 to eight data lines, plus a converter IC designated MM 5230B0. Outputted from this IC are eight data lines which are connected to the IC type 3347 8 × 80 buffer. A recirculation path 42R from output to input of the buffer is indicated, which enables reloading of the buffer for retransmission of card data when requested. The buffer is shifted by clock pulses indicated as being derived in clock generator block 63, which in turn is fed by master clock circuitry 75. Clock circuitry 75 preferably provides for nine crystal-controlled selectable baud rates, namely 110, 150, 300, 600, 1200, 1800, 2400, 3600, and 4800. Provision for an external clock input is also part of the interface assembly. The output of the buffer comprises eight data lines which are inputted to the eight bit multiplexer 43, which is of conventional logic design. The multiplexer performs the function of feeding through outputs from the buffer, or other coded characters as are described subsequently. The multiplexer has eight output data lines, which provide eight bit characters in condition for inputting to the TR chip of circuitry 44.

The timing of readout of data from buffer 42, as well as control of whether all information is read out, is subject to the action of the blocks which are indicated at 61, 62, 63 and 66. The sequence circuitry receives inputs indicating operations desired by the CPU, and generates an output STATE signal which controls the operation of the interface. The primary component of the sequence circuitry is a six state sequence counter, within block 66, which counter is sequenced through different states in order to program the interface to operate on the data which is read from each successive card in the card reader. The overall sequence of operation is discussed in detail hereinbelow. At this point, it is important to note that once during each sequencing cycle, buffer clock pulses are transmitted from block 63 to the buffer 42, for reading card data out of the buffer so that it is available for transmission.

The interface assembly of this invention provides for a feature which is referred to as "trailing zero suppression". By this, it is meant that if all of the information in any given card which is read is contained within a first given number of columns, such that all of the following columns contain nothing but zeros (blanks), then provision is made whereby the data following the last non-zero column is not transmitted, thereby reducing the required time for transmission. Another way of stating this feature is that all of the trailing columns which contain no information, and which when read would contain nothing but zeros, are suppressed with respect to the transmission operation. The circuits which do this are indicated at blocks 61, 62 and 63. The DA/THRL counter 61 receives, depending upon the state generated by the sequence circuitry, either DA pulses or THRL pulses. When a card is being read, a DA pulse appears for each column, irrespective of the data content of such column. Counter 61 counts successively the DA pulses until it reaches 80. The variable record counter 62 is connected to the DA/THRL counter so that it can record the complement of the count in the DA/THRL counter. However, it has associated with it circuitry such that it is set corresponding to the latest DA/THRL count only when such last data word is a non-zero character, i.e., contains at least a single 1. As shown in the diagram, DA and $\overline{SP}$ signals are connected to the variable record counter. The $\overline{SP}$ signal from the card reader electronics indicates that the 12 bit data word is not a complete space, i.e., it is not all zeros. Whenever this condition obtains, and a DA signal appears, the variable record counter is set to the complement of the latest count of the DA/THRL counter. In this manner, the last setting of the variable record counter will contain information corresponding to the last data character which contained information, i.e., was not all zeros.

After all 80 columns of a card have been read, and the data is stored in buffer 42, the interface unit is switched into the transmit mode. In this mode, THRL pulses from block 63 are inputted to both counters 61 and 62, and at the same time buffer clock pulses are fed into the buffer, such that the 80 words of information in the buffer are circulated. The THRL pulses are also inputted to the TR chip (part of XMT/RCV block 44), enabling that chip to receive successive eight bit characters which are available from the buffer through the multiplexer 43. The chip converts the parallel characters into series characters which are passed through the level converter, and then the modem, to the communications equipment. During this readout period, when the interface unit is in transmit, counter 61 starts at a zero count and is counted up toward 80 by the THRL pulses. At the same time, the THRL pulses count down counter 62 from its setting (which initially corresponded to the complement of the last non-zero data word) until counter 62 reaches 0. This corresponds to the last non-zero data character in the buffer, at which time counter 62 produces an output signal which is connected to the clock generator circuitry 63. The result of this signal is to disenable the THRL pulses, and to gate out high speed clock pulses which are connected to the buffer, and counter 61. These pulses are received until the DA/THRL counter reaches 80, whereby it is set back to zero, at which time the data in the buffer 42 is recirculated to its initial position. Corresponding to this setting, the counter 62 again is set to a count corresponding to the last non-zero data character. Thus, the interface system is in condition whereby, if called upon, it can retransmit the data words again, with trailing zeros suppressed.

Sequence circuitry block 66 is shown as having four output lines which are connected to word generators block 67. In certain of the sequence states, characters are generated under control of the sequence circuitry, passed through eight bit multiplexer 43, and transmitted to the communications equipment. The word generator circuitry 67 is conventional logic circuitry connected to the sequence counter portion of circuitry 66, having four parallel output lines connected to the eight bit multiplexer in such a way that specific characters are passed to the TR chip for transmission.

In the receiving mode, serial information which constitutes a command character from the CPU is transmitted from the communications equipment through to the TR chip, where it is converted into eight bit parallel form and connected to command decode circuitry 72, comprising conventional logic decode circuitry. The characters that are decoded include the DC1 pick command, DC2 retransmit command, and DC3 continuous pick command. DC3 may alternately, when a plurality of card readers are used in an addressable assembly, represent an error signal.

In the addressable assembly of this invention, an address character representing one of a plurality of card readers is inputted to address control circuitry 54, where it is compared with built in memory which contains the coded address of the particular card reader. If such card reader has been addressed properly, an output signal is provided to gate block 73 which enables the passing of command signals from the CPU through to the card reader. In the absence of proper addressing, command characters from the communications equipment are not acted upon.

Referring to the upper portion of FIG. 2, there are seen the primary components of the status transmission portion of the interface assembly of this invention. A plurality of input signals from the card reader are shown, comprising "pick failure", "read check", "card jam", and "halt". These are "trouble" signals developed by the card reader representing certain conditions which call for special action on the part of the interface unit. These signals are fed into decode circuits 81, which produce an output which is connected to status XMT circuitry 83. Circuitry 83 provides a three line output which is connected to status word generator 85, which in turn inputs character information to the four bit multiplexer 86. When a status character has been generated by circuit 85, multiplexer 86 modifies the eight data lines which are connected to the TR chip (block 44), thus enabling transmission of a special eight bit status character.

Still referring to FIG. 2, there is seen a block 71 designated XMT/RCV mode control. This block contains logic circuitry and a XMT/RCV flip-flop, the outputs of which are used as the XMT and RCV mode control signals. Depending upon the state of this mode control signal, the entire interface unit is placed in either the transmit or receive mode. Mode signals for setting or resetting the XMT/RCV flip-flop are generated in the sequence circuitry 66 and are also generated in the status transmit circuits 83.

Reference is made to Table B hereinbelow which lists the interface output lines which carry information to and from the surface. The listed output lines are suitably provided by means of a 25-pin connected (Cannon DBM-25S or equivalent).

TABLE B 1. (BA) XMT DATA (from reader)
   a. Status Signals:
      BEL
      ENQ
      NAK
      ACK
   b. Data Characters, comprised of one start bit (space); followed by 8 ASCII data bits, LSB first; followed by one or two stop bits (mark). If odd or even parity is used, data characters are composed of one start bit (space); followed by 7 ASCII bits; followed by 1 parity bit; followed by one or two stop bits. Two stop bits are provided at 110 baud; one stop bit is provided at all other baud rates.
   c. Transmission Format Signals, other than data characters:
      LINE FEED
      CARRIAGE RETURN
      EOT
2. (BB) RCV DATA (from CPU)
      DC1
      DC2
      DC3
      ADDRESS
3. (CD) DATA TERMINAL READY (from reader)
4. (CA) REQUEST TO SEND (from reader)
5. (CB) CLEAR TO SEND (from modem)
6. (CF) CARRIER PRESENT (from modem)

On the data interface lines, transmitted data (BA) and received data (BB), if no parity is chosen, all data characters are suitably composed of, (a) one start bit (space); (b) followed by eight ASCII data bits, LSB first, (c) followed by one stop bit (mark). One stop bit is supplied at all baud rates except 110 baud. At 110 baud, two stop bits are supplied. If either odd or even parity is chosen, all data characters are composed of (a) one start bit (space); (b) followed by seven ASCII data bits; (c) followed by one parity bit; (d) followed by one or two stop bits as above.

The transmission format on the transmitted data line (BA), for each card read and transmitted, or for each card retransmitted, is: first, LINE FEED; second, a variable record length of card data from one to 80 characters in length with trailing zeros suppressed; third, CARRIAGE RETURN; and fourth, in the event that the card read is the last card in the deck, END OF TRANSMISSION. Serial word length is composed of one start bit, eight character bits, or seven character bits + parity, and one stop bit (except in 110 baud, where two stop bits are provided). Parity is strap-selectable (odd, even, or none).

Typical operation of the interface is as follows: When the card reader is turned on, or the reset button is pushed, the interface is placed in the receive mode. When the card reader motor comes up to speed, the interface turns on the DATA TERMINAL READY line (CD) and lights the READY lamp. When the CARRIER PRESENT line (CF) from the communications equipment goes on, the RECEIVED DATA line (BB) is enabled, and the interface in the receive mode looks for a serial command word (e.g., a DC1 pick command or a DC2 retransmit command). If a pick command is received, a card is picked and read, a Hollerith to ASCII conversion is performed on the data, and the ASCII card data is clocked into the buffer storage register.

As the card is being read on a column by column basis, the input Hollerith data lines are monitored, the individual data column count is recorded by the DA/THRL counter, and the variable record counter is updated by the DA/THRL counter to reflect the last card column in which punched or written data is detected. If less than 80 DA pulses are received, as would be the case where a 40 column mode of operation is used, the additional buffer clock pulses required to place the card data in the correct buffer locations is supplied at 115 KHz at the trailing edge of the card. Once the complete card has been read (at the trailing edge of $\overline{CIS}$), the RCV/XMT flip-flop is placed in the transmit mode, the buffer is put in the recirculation mode, and the REQUEST TO SEND line (CA) is turned on if the CLEAR TO SEND line (CB) is off (request to send cannot be turned on with clear to send on). Up to this point in time, the sequence counter, a six-stage shift counter which controls the transmission sequence, has remained in the 0-state. This counter is used to control the eight-bit multiplexer 43, which feeds the parallel inputs to the TR chip. When the CLEAR TO SEND line (CB), from the data communications equipment, is turned on, the sequence counter is indexed to state 1, in which state the multiplexer is enabled to load the LINE FEED character into the transmitter holding register portion of the TR chip. If the transmitter register is empty, the line feed character is automatically transferred from the transmitter holding register into the transmitter register, and is serially transmitted on the TRANSMITTED DATA line (BA), with start, stop, and parity (if selected) bits added. When the transmitter holding register is emptied of the line feed character, the sequence counter is indexed to state 2, which allows the multiplexer to connect the outputs of the buffer storage register to the inputs of the transmitter holding register (TR chip). The buffer is then emptied into the chip with THRL pulses. In state 2, the generation of THRL pulses is under the control of the variable record counter, which decrements to allow transmission of the buffer data up to the last card column in which punched or written data was detected.

At the same time (state 2) in which buffer data is' being transmitted, it is also being recirculated in the buffer, to allow the data to again be available in the event of a retransmission request. Any addition clock pulses which may be necessary to place the information in the correct buffer location, as a result of the trailing zero suppression, are supplied at a high frequency, under the control of the DA/THRL counter.

When all of the buffer data has been transmitted, and recirculated back to its correct buffer locations, the sequence counter is indexed to state 3. In state 3, the multiplexer loads the CARRIAGE RETURN character into the transmitter holding register, with the THRL clock generator. When the carriage return character is in the process of being transmitted, the sequence counter is indexed to state 4. In state 4, the CHECK CONDITIONS line is interrogated to determine if the previous card had been the last card in the deck and if the motor has shut down. If the last card has been read, the multiplexer loads the END OF TRANSMISSION character into the transmitter holding register portion of the TR chip, with the THRL clock generator. When the end of transmission character is in the process of being transmitted, the sequence counter is indexed to state 5. In state 5, the interface waits until the stop bit of the end of transmission character has been transmitted, then returns to the receive mode.

Where the last card in the deck has been transmitted, and the interface is back in the receive mode, a delay is initiated, during which the interface waits for a retransmit command for the last card. This delay is approximately 0.7 seconds. At the end of this delay, if no retransmit command has been decoded, the data terminal ready line (CD) is turned off, and the READY lamp is extinguished.

If, however, when the CHECK CONDITIONS line was interrogated in state 4, the motor was not shut down, and there still remained additional cards to be read in the input hopper, the interface goes to the receive mode, the sequence counter is set back to state 0, and the REQUEST TO SEND line (CA) is turned off, as soon as the stop bit for the carriage return character has been transmitted. The interface then begins again to search for a new DC1 pick command or for a DC2 retransmit command. If a new pick command is received, the sequence starts again, and proceeds as stated above. If, however, a retransmit command is decoded, the interface immediately goes to the transmit mode, turns on the REQUEST TO SEND line (CA), and repeats the sequence of transmitting. In this manner, the previous card's data may be retransmitted as many times as desired.

If, when a pick command is received, either a mispick or a card jam occurs, the motor shuts down, the data terminal ready line (CD) is turned off, and the READY lamp is extinguished. The trouble must then be cleared, and the reset button pushed to restart the motor and place the reader in a ready condition, whereby it again searches for a DC1 pick command.

Figure 3:
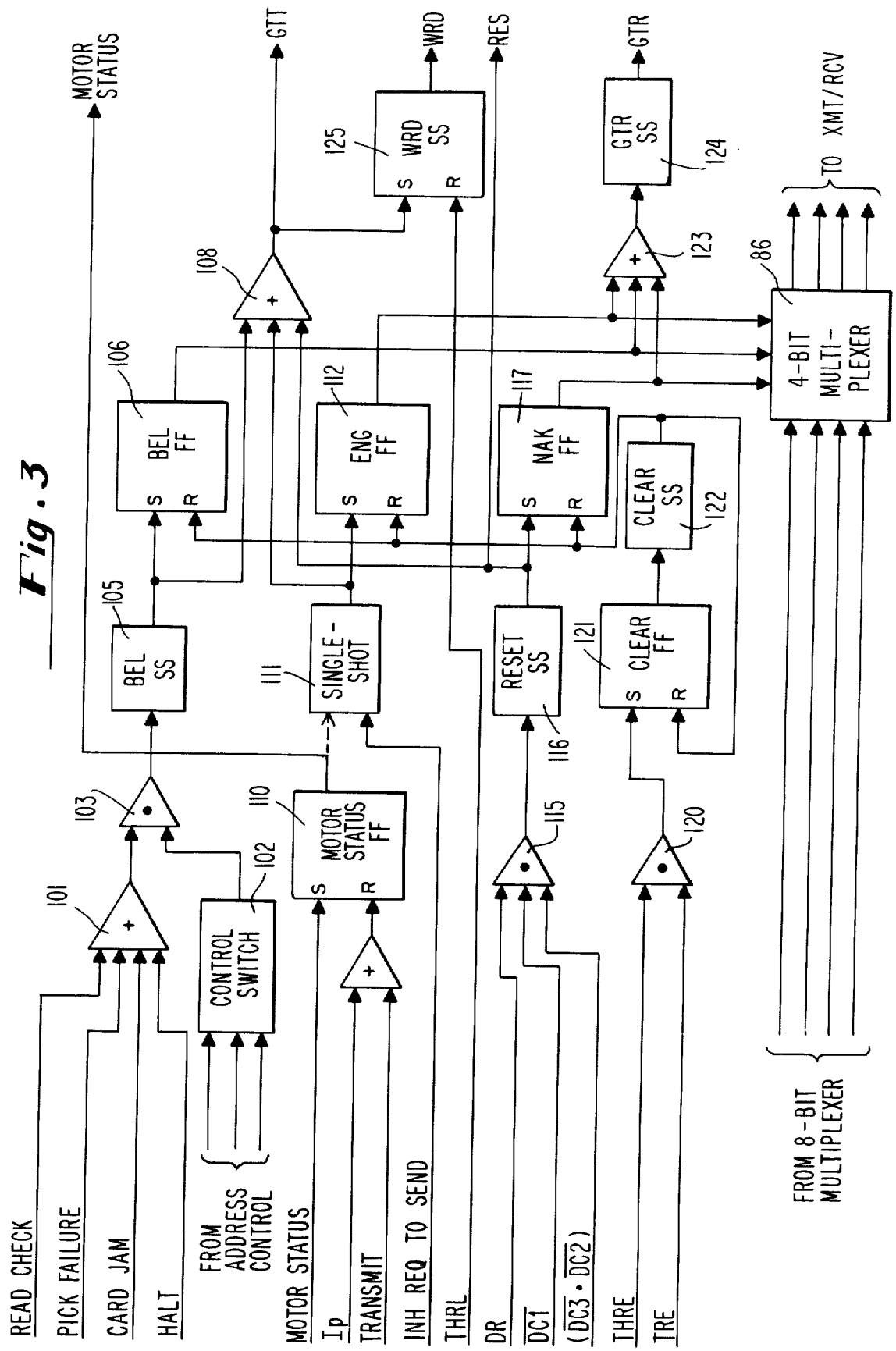
FIG. 3 is a block diagram of the status transmission components of the interface assembly of this invention.

Referring now to FIG. 3, there is illustrated a detailed block diagram of the status transmission circuitry utilized in the interface assembly of this invention. Card reader status signals are inputted to OR gate 101, which produces an output which is connected to AND gate 103 whenever any one of the "trouble" signals is received. Signals from the address control circuitry are connected to control switch circuitry 102, which provides an enabling output signal connected to gate 103 when the particular card reader has been properly addressed. Under these circumstances, an output signal is connected to the single-shot 105. The output of this single shot sets flip-flop 106, and at the same time is connected through OR gate 108 to produce a signal which is connected to the GTT line. The output of flip-flop 106 is connected as an input to the four bit multiplexer 86, establishing the condition for transmitting a BEL character.

When the card reader motor is turned on, due to either power turn-on or pushing of the reset button with the cards in the input hopper, a motor status signal sets the motor status flip-flop 110, the output of which is available as a motor status signal. This signal may also be connected to the single shot 111, the output of which sets flip-flop 112 and is gated through OR gate 108 to the GTT line. The output of flip-flop 112 is connected as one of the inputs to the four bit multiplexer 86.

When the addressable feature is not incorporated, such that the card reader is alone in communicating with the CPU, the output of the motor status flip-flop is suitably connected through to the single shot 111. In this arrangement, when flip-flop 112 is set it provides an output which establishes at multiplexer 86 the condition for generating an ENQ signal, which is passed through to the CPU to inform that the card reader is ready to accept a signal. However, when the card reader is one of a plurality of addressable readers, the output of flip-flop 110 is suitably not connected through to single shot 111. Rather, a signal from the address control circuitry, designated INH REQ TO SEND, is connected to single shot 111 and triggers it when the reader receives a proper address word. Under such circumstances, the word which is generated through flip-flop 112 and multiplexer 86 is designated the ACK signal, which is sent back to the CPU as an acknolwedgement that it has been properly addressed and is ready to receive commands.

Still referring to FIG. 3, the path starting with AND gate 115 performs the function of establishing the condition for generation of a NAK signal, which is a "negative acknowledge" character utilized to alert the CPU that it must re-send a proper command. In other words, the generation of this signal carries the information that a command has been received, but that it is not a proper command. The inputs to gate 115 are the DR signal, meaning that a data word was received at the TR chip, and inputs indicating that the received word was not a DC1, DC2 or DC3 command. It is to be observed that whatever number of commands which the interface may be programmed to receive from the CPU, appropriate additional signals may be inputted to gate 115. When an output is produced at gate 115, it triggers reset single shot 116, the output of which sets NAK flip-flop 117. At the same time, a reset signal is outputted to reset the DR line, and a signal is gated through OR gate 108 to the GTT line. The set condition of the NAK flip-flop sets the correct data bits of the four bit multiplexer 86 to feed the NAK character into the TR chip for transmission to the CPU.

The output of gate 108 also sets word WRD flip-flop 125. The output of flip-flop 125 is connected to the THRL clock generator in block 63 which generates clock pulses to load the various status characters into the TR chip when it receives the set signal from flip-flop 125 and the interface has received the clear to send (CB) signal. Flip-flop 125 is reset by the generation of a THRL signal.

The last path of the block diagram of FIG. 3 is employed to generate a CLEAR signal for re-setting the status word flip-flops whenever a status character has been read out of the TR chip. Following transmission of a status word, the THRE and TRE signals are received from the TR chip indicating that the status character has been transmitted. This causes setting of the clear flip-flop and resultant re-setting of the three status word flip-flops.

In reviewing the operation of the status transmission circuitry, when the card reader is turned on and the motor status flip-flop 110 is set, the motor status line, which is connected to the XMT/RCV circuitry, places the card reader in a ready condition. Either the motor status flip-flop, or the INH REQ TO SEND signal (in the addressable embodiment) sets flip-flop 112, resulting in setting the correct data bits in multiplexer 86 to feed either an ENQ or ACK character to the TR chip. Also, a negative pulse is gated through 108 and placed on the GTT line setting the interface to XMT mode and setting the WRD flip-flop. In this mode, the REQ TO SEND line (CA) is turned on. When the clear to send (CB) is also turned on by the modem, the THRL clock generator in block 63 is enabled. Also, as a result of WRD flip-flop 125 being set, the input line to the THRL clock generator is also set, which combination allows a THRL clock pulse to be generated. This pulse loads the ENQ character from the multiplexer 86 into the transmitter holding register of the TR chip, from whence it is sent out on the transmitted data lines. The generation of the THRL clock pulse is also fed back to the WRD flip-flop, which is reset, thereby removing the set condition at the input to the THRL clock generator. This guarantees that only one THRL pulse is generated, thereby guaranteeing that only one ENQ character (or ACK character) will be sent. When lines THRE and TRE go high, meaning that the chip transmitter has been emptied of the ENQ character, the clear flip-flop 121 is set, causing clear single shot 122 to generate a negative pulse which resets both the clear flip-flop and the ENQ flip-flop. The resetting of the ENQ flip-flop causes the GTR single shot 124 to output a negative pulse which resets the interface back to the receive mode to allow the receiver to examine the input data lines for a DC1 or DC2 command.

If the card reader is in a ready condition, and any one of the trouble indications arise, then a trouble character (BEL) is generated and sent on the transmitted data line to alert the CPU. Detection of a trouble condition causes single shot 105 to set flip-flop 106, and to produce a negative pulse on the GTT line. The set condition of flip-flop 106 sets the correct data bits in the multiplexer 86 to feed a BEL character into the TR chip, while the pulse on the GTT line also sets the WRD flip-flop, thereby enabling transmission of a single BEL character is a manner similar to that described above for the ENQ (or ACK) character. In this way, the CPU is alerted to a not ready condition in the reader. When the trouble has been corrected, the CPU is alerted to a ready mode by the transmission of an ENQ (or ACK) character.

If the reader receives any command which it does not recognize, such as might be caused by interference on the communications line, etc., the reader responds with an NAK character to alert the CPU that it must re-send the proper command. This is accomplished because gate 115 outputs a signal which causes single shot 116 to produce a negative pulse, which sets the NAK flip-flop. The reset (RES) line is fed to the TR chip to reset the data received line (DR), such that the TR chip will not act upon transistory signals. In a manner similar to that for generation of the BEL and ENQ signals, flip-flop 117, flip-flop 125 and multiplexer 86 combine to establish the condition for generation of a single NAK character which is transmitted to the CPU. It is to be noted that in the transmission of these status characters, normal transmission sequence is not entered, the sequence counter remaining in state zero.

Referring now to FIG. 4, there is shown a block diagram of the address/error control circuitry for the addressble reader system. The circuitry as shown in this diagram exists in the interface portion of each card reader unit which is a part of the over addressable system.

When characters are received at the card reader from the CPU, the eight line character, after undergoing serial to parallel conversion through the TR chip, in inputted to a comparator 158. Also inputted to comparator 158 is a four bit signal provided by a hexadecimal addressing switch 160 located in the card reader. The setting of switch 160 corresponds to the address chosen for that particular unit. In the preferred embodiment of this invention, the address characters utilized are the eight bit characters comprising the 16 undefined ASCII characters in which the four most significant bits are ones. The comparator 158 comprises eight exclusive OR gates, with four of the gates, corresponding to the four most significant bits, passing "one" inputs. The other four exclusive OR gates of 158 each have one of the two input terminals connected to one of the four outputs of the switch 160. when the other four bits of the address character are proper in accordance with the setting of the switch, all eight exclusive OR circuits produce output signals. These are passed through to address decoder 162, which comprises an eight input NAND circuit. Thus, when and only when the received address word conforms to the setting of switch 160, is an output produced by decoder 162. This output sets address flip-flop 164, which generates both a "decoded address" signal and a "inhibit request to send" signal. This latter signal is connected to an appropriate gate in the sequence circuitry to inhibit the generation of a CA signal (request to send) unless the address decode flip-flop is set. The decoded address signal is also inputted to the status transmit circuitry, as indicated in FIG. 3.

In the embodiment as illustrated in FIG. 4, the eight bit data character is inputted to a DC 3 decode circuit 166, which decodes the presence of a DC3, or "error" command signal. The presence of such a signal sets error flip-flop 169, which in turn drives error lamp driver 170, which causes the lighting in the card reader of an error lamp. This indicates to the operator that there has been some error in the information received at the CPU.

The four bits from comparator 158 which correspond to the four most significant bits are inputted to decoder 167, along with the output of address decoder 162. Decoder 167 produces an output when and only when an address has been received, and it is the wrong address. This output is gated through OR gate 168 to reset address flip-flop 164, thereby inhibiting subsequent activity by this particular card reader. This is done, such that if a second address is sent from the CPU, the first addressed reader will become "not addressed" at the same time the second reader is addressed. Likewise, the "not ready" and "initialize" signals are gated through gate 168 to reset the address flip-flop, so that the card reader does not proceed until a proper address has been received and acknowledged. The output of the address flip-flop 164 is also gated through respective AND gates 171 through 174 to provide the DC1, DC2, DC3, and GTT signals only when the card reader has been properly addressed.

In the description of this invention, details of the preferred embodiment have been set forth by way of disclosure, and not by way of limitation. Where conventional circuitry elements are utilized, as is the case for the sequence circuitry, the clock generators, etc., these have been described as blocks of a block diagram since the specific forms of logic circuitry are in the prior art and are a matter of design choice.

By way of further example, the word generator circuits as utilized in this invention comprise TTL logic components, suitably for generating four bit characters. Thus, the status word generator 85 comprises, in the preferred embodiment illustrated, three flip-flop outputs, which three outputs are connected in a predetermined manner to five different NAND gates which make up multiplexer 86. Four data lines from the eight bit multiplexer, as seen in FIG. 3, are also inputted in a predetermined manner to the five NAND gates. The outputs of the five NAND gates are combined in a predetermined manner to provide four output lines. The manner of combining the inputs and outputs produces the specific multiplexer function. In this case, if no signals appear on the three lines coming from the respective status word flip-flops, the four lines from the eight bit multiplexer are effectively passed straight through, such that the multiplexer 86 has no effect on the signal being generated. The system of this invention embraces placing the circuitry of FIG. 3, or any portion thereof including the four bit multiplexer 86, on a separate board, which board is positioned within the housing of the circuitry so as to be easily removed and replaced. Thus, if it is desired to make available a different set of status words, or to add additional status words, such changes can be "strapped" into the card reader interface by simply removing one board and replacing it with another. In a like manner, word generator block 67 and command decode block 72 are suitably placed on boards which are positioned to be easily physically replaced, so that different words can be generated for use in the data transmission sequence and different commands can be decoded for operation of the card reader. In an alternate embodiment, either multiplexer or decode circuit, or any combination of them, may include switches activated either mechanically by the card reader operator, or electronically by a predetermined command from the CPU, such that the change in words which the unit may transmit and/or receive may be accomplished automatically without replacement of a circuit board.

We claim:

1. A card reader system providing for the interfacing of a plurality of card reader units with a central processing unit, comprising:
    a. a central processing unit;
    b. a plurality of card readers for reading cards, adapted to communicate with said central processing unit;
    c. communication means for providing communication of information between said card readers and said central processing unit;
    d. each of said plurality of card readers having
        i. address means for receiving address signals from said central processing unit and for selectively enabling and disenabling card reader operation depending upon whether such card reader has been addressed;
        ii. status word means for generating status words representative of operating conditions of said card reader;
        iii. data word means for generating data words representative of data from said cards;
        iv. multiplexing means for multiplexing said data words and said status words;
        v. means for converting said data words and said status words from a first form to a second form suitable for transmission to said central processing unit; and
    e. output transmit means for outputting data in said second form from said card reader to said communication means for transmission to said central processing unit.

2. The system as described in claim 1, wherein each said card reader has a buffer for storing data as it is read from a card, and recirculation means for recirculating said data through said buffer as said data is transmitted through said output transmit means.

3. The system as described in claim 2, comprising means for transmitting data read from a card, said retransmitted data having trailing zero suppression.

4. The system as described in claim 1, wherein each said card reader comprises sequence means for generating sequence characters and transmitting same with said converted card reader data in a predetermined sequence.

5. The system as described in claim 1, wherein said address means has storage means for storing a predetermined address chosen from a group of 16 respective addresses.

6. The system as described in claim 5, wherein said address means has circuitry for decoding a multi-bit address signal transmitted from said central processing unit, said circuitry comprising means for decoding when the four most significant bits of said address signal are ones and when the four least significant bits correspond to address information in said storage means.

7. The apparatus as described in claim 1, wherein said address means comprises means for enabling said each such card reader for subsequent receipt of other commands sent from said central processing unit following receipt of an address signal.

8. The system as described in claim 1, wherein said status word means has means for generating one of a plurality of status characters, and wherein said status word means combines with said output transmit means to transmit said generated status character to said central processing unit.

9. The system as described in claim 1, wherein said status word means is in operative connection with said address means whereby a status character is generated and transmitted to said central processing unit as a function of whether said card reader has been addressed.

10. The system as described in claim 1, wherein each of said plurality of card readers has receiving means for receiving information communicated to it from said central processing unit, and mode means for enabling when said output transmit means is operable and when said receiving means is operable.

11. The system as described in claim 10, wherein said card reader contains operation means for performing a plurality of card reader operations, and said receiving means has command decode means connected to said operation means for decoding commands received from said central processing unit and causing said card reader to perform a selected operation in accordance with the received command.

12. The system as described in claim 1, wherein said data word means comprises trailing zero means for suppressing trailing zero words read from said card reader, said trailing zero means comprising a complement counter for storing information representative of the last word read having non-zero data.

13. The system as described in claim 12, wherein said data word means comprises card reader electronics for reading data from cards, storage means for storing data in the form of a plurality of words read from a card, and means for outputting said plurality of words to said multiplexing means.

14. The system as described in claim 1, wherein said data word means comprises retransmitting means for retransmitting data read from a card, said retransmitting means cooperating with said trailing zero means to provide trailing zero suppression of said retransmitted data.

15. A card reader adapted to interface with a remote control processing unit, comprising:
  a. reading means for reading cards and generating data signals;
  b. condition means for generating condition signals representative of predetermined conditions of said card reader;
  c. operation means, for receiving operation commands whereby said card reader performs predetermined operations;
  d. transmission means connected to said reading means and said condition means for generating information words in a form suitable for transmission to said central processing unit, said transmission means having at least one adaptable component whereby at least one of said information words may be altered, said transmission means also having
    i. means for generating information words representing card reader data, said card reader data words having trailing zeros suppressed,
    ii. a buffer for storing data read from a card, and
    iii. recirculation means for recirculating said data through said buffer as said data is transmitted; and
  e. receiving means connected to said operation means for receiving commands from said central processing unit and generating signals for controlling the operation of said card reader, said receiving means having at least one adaptable component whereby at least one of said commands may be altered.

16. The card reader as described in claim 15, comprising address means for receiving address signals from said central processing unit and for selectively enabling and disenabling card reader operation depending upon whether such card reader has been addressed.

17. The card reader as described in claim 16, wherein said condition means is operatively connected to said address means whereby it is enabled to generate said condition signals as a function of whether said card reader has been addressed.

18. The card reader as described in claim 15, wherein said recirculation means combines with said transmission means to provide means for retransmitting card data with trailing zero suppression after it has been recirculated through said buffer.

19. A card reader system providing for the interfacing of a plurality of card reader units with a central processing unit, comprising:
  a. a central processing unit;
  b. a plurality of card readers for reading cards, adapted to communicate with said central processing unit;
  c. communication means for providing communication of information between said card readers and said central processing unit;
  d. each of said plurality of card readers having
    i. address means for receiving address signals from said central processing unit and for selectively enabling and disenabling card reader operation depending upon whether such card reader has been addressed;
    ii. status word means for generating status words representative of operating conditions of said card reader;
    iii. data word means for generating data words representative of data from said cards, said data word means having means for suppressing trailing zero words;
    iv. means for converting said data words and said status words from a first form to a second form suitable for transmission to said central processing unit;
  e. said data word means having a buffer for storing data as it is read from a card and recirculation means for recirculating said data through said buffer when said data is read out of said buffer, and means for retransmitting data read from said card reader with trailing zero suppression.

20. A card reader system providing for the interfacing of a plurality of card reader units with a central processing unit, comprising:
  a. a central processing unit;
  b. a plurality of card readers for reading cards, adapted to communicate with said central processing unit;
  c. communication means for providing communication of information between said card readers and said central processing unit;
  d. each of said plurality of card readers having
    i. address means for receiving address signals from said central processing unit and for selectively enabling and disenabling card reader operation depending upon whether such card reader has been addressed;
    ii. status word means for generating status words representative of operating conditions of said card reader;
    iii. data word means for generating data words representative of data from said cards, said data word means having means for suppressing trailing zero words;
    iv. means for converting said data words and said status words from a first form to a second form suitable for transmissin to said central processing unit;
  e. said address means having storage means for storing a predetermined address chosen from a plurality of respective addresses, and circuitry for decoding a multi-bit address signal transmitted from said central processing unit, said circuitry comprising means for decoding when the four most significant bits of said address signal are ones and when the four least significant bits correspond to address information in said storage means; and f. output transmit means for outputting data in said second form from said card reader to said communication means for transmission to said central processing unit.

21. A card reader system providing for the interfacing of a plurality of card reader units with a central processing unit, comprising:
 a. a central processing unit;
 b. a plurality of card readers for reading cards, adapted to communicate with said central processing unit;
 c. communication means for providing communication of information between said card readers and said central processing unit;
 d. each of said plurality of card readers having
  i. address means for receiving address signals from said central processing unit and for selectively enabling and disenabling card reader operation depending upon whether such card reader has been addressed;
  ii. status word means for generating status words representative of operating conditions of said card reader;
  iii. data words means for generating data words representative of data from said cards;
  iv. means for converting said data words and said status words from a first form to a second form suitable for transmission to said central processing unit;
 e. receiving means for receiving information communicated to it from said central processing unit;
 f. output transmit means for outputting data in said second form from said card reader to said communication means for transmission to said central processing unit; and
 g. mode means for enabling when said output transmit means is operable and when said receiving means is operable.

22. A card reader apparatus adapted for interfacing with a central processing unit, comprising:
 a. address means for receiving address signals from said central processing unit and for selectively enabling and disenabling card reader operation depending upon whether such card reader has been addressed;
 b. status word means for generating status words representative of operating conditions of said card reader;
 c. data word means for generating data words representative of data from said cards;
 d. output transmitting means for transmitting said data words and said status words from said card reader, said transmitting means having means for suppressing trailing zero data words;
 e. retransmitting means for retransmitting data words, said retransmitting means having means for suppressing trailing zero data words.

23. The apparatus as described in claim 22, wherein said trailing zero means comprises a complement counter for storing information representative of the last data word read which has non-zero data.

24. The apparatus as described in claim 22, wherein said address means has circuitry for decoding a multi-bit address signal transmitted from said central processing unit, said circuitry comprising means for decoding when the four most significant bits of said address signal are ones and when the four least significant bits correspond to address information in said storage means.

25. The apparatus as described in claim 22, comprising receiving means for receiving information communicated to it from said central processing unit, and mode means for enabling when said output transmitting means is operable and when said receiving means is operable.

* * * * *

UNITED STATES PATENT AND TRADEMARK OFFICE
CERTIFICATE OF CORRECTION

PATENT NO.   : 4,065,662
DATED        : December 27, 1977
INVENTOR(S)  : John S. Garczynski et al It is certified that error appears in the above-identified patent and that said Letters Patent are hereby corrected as shown below:

```
Column 7, line 24, delete "surface" and insert --interface--.
Column 11, line 51, delete "is" and insert --in--.
Column 12, line 14, delete "in" and insert --is--.
Claim 3, line 2, delete "transmitting" and insert
      --retransmitting--.
```

Signed and Sealed this

Twenty-third Day of May 1978

[SEAL]

Attest:

RUTH C. MASON
*Attesting Officer*

LUTRELLE F. PARKER
*Acting Commissioner of Patents and Trademarks*